UNITED STATES PATENT OFFICE 2,400,006

INSECT REPELLENT COMPOSITIONS

Howard A. Jones and Bernard V. Travis, Orlando, Fla., assignors to the United States of America as represented by the Secretary of Agriculture No Drawing. Application March 3, 1945,
Serial No. 580,792

16 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to insect repellent compositions and has among its objects the provision of effective and long-lasting compositions for repelling insect pests, particularly mosquitoes.

It has been found that effective insect repellent compositions can be prepared by employing as their essential active ingredients compounds of the class of alkoxyphenylalkyl alcohols, having the general formula

RO.C₆H₄.R'OH wherein R is an alkyl group and R' is a divalent radical having the general formula $C_nH_{2n}$, where $n$ is an integer of at least one, such as the methylene radical (—CH₂—), the ethylidene radical (CH₃CH=), the ethylene radical (—CH₂CH₂—), the trimethylene radical (—CH₂CH₂CH₂—), etc., and where the relative positions of RO and R'OH are other than the meta position, that is, RO and R'OH are in either the ortho or the para positions to each other. For example, such compounds of this class as p-methoxybenzyl alcohol, p-ethoxybenzyl alcohol, p-n-propoxybenzyl alcohol, 1-(p-methoxyphenyl)ethanol, 2-(p-methoxyphenyl)ethanol, 3-(p-methoxyphenyl)-n-propanol, and o-methoxybenzyl alcohol have been found to repel insects for considerable periods of time and are especially effective in repelling certain types of Aedes mosquitoes.

These alkoxyphenylalkyl alcohols may be used in numerous ways to repel insects. They may be applied to the area from which the insects are to be repelled, such as to the exposed parts of the body or to clothing, either in their undiluted form or in suitable inert carriers, such as solvents like mineral oils, vegetable oils and various alcohols, etc. They may also be incorporated into inert powders to obtain a paste or cream for application to the skin and may also be applied in the form of an aqueous emulsion, particularly in the treatment of clothing to prevent mosquito bites and chigger attachments. For example, when applied to impregnate clothing, p-methoxybenzyl alcohol has been found to be very effective in preventing the attachment of Trombiculidae (chiggers). Furthermore, in any of the aforementioned modes of application, mixtures or blends of individual alkoxyphenylalkyl alcohols may be employed and they may also be mixed with other known insect repellents, such as dimethyl phthalate.

The compositions of this invention have been tested by the standard method employed in evaluating insect repellent compositions. In this method one-fourth teaspoonful of the material to be tested is applied to the forearm from wrist to elbow and the arm then exposed to a large number of hungry mosquitoes or other biting insects, the time elapsing to the first bite being recorded. This test is of a practical nature and gives results that are highly indicative of the insect repellent in actual field use.

The following table illustrates the results obtained against Aedes aegypti and Anopheles quadrimaculatus as examples of insects against which the invention is applicable, using the above method and utilizing p-methoxybenzyl alcohol, p-ethoxybenzyl alcohol, p-n-propoxybenzyl alcohol, 1-(p-methoxyphenyl)ethanol, 2-(p-methoxyphenyl)ethanol, 3-(p-methoxyphenyl)-n-propanol, and o-methoxybenzyl alcohol in undiluted form and diluted with inert carriers.

| Material | Average repellent time to first bite in minutes ||
|---|---|---|
| | Aedes aegypti | Anopheles quadrimaculatus |
| p-Methoxybenzyl alcohol | 262 | 51 |
| p-Ethoxybenzyl alcohol | 180 | 38 |
| p-n-Propoxybenzyl alcohol | 242 | 49 |
| 1-(p-methoxyphenyl)ethanol | 274 | 34 |
| 2-(p-methoxyphenol)ethanol | 264 | 38 |
| 3-(p-methoxyphenyl)-n-propanol | 219 | 21 |
| o-Methoxybenzyl alcohol | 282 | 135 |
| p-Methoxybenzyl alcohol, 50% Ethyl alcohol, 50% | 218 | 79 |
| p-Methoxybenzyl alcohol, 75% Glycerine, 25% | 131 | 80 |

In addition to the foregoing examples shown in the above table, a large number of tests were conducted against natural populations of Aedes taeniorhynchus under actual field conditions. It was found that the alkoxyphenylalkyl alcohols gave good repellent action, for example, p-methoxybenzyl alcohol giving repellent action similar to that shown in the above table.

The high repellent value of o-methoxybenzyl alcohol is quite unexpected and could not have been predicted from the results obtained with p-methoxybenzyl alcohol and other p-alkoxyphenylalkyl alcohols.

It has been found that while p-methoxybenzyl alcohol causes a slight irritation of sensitive skin if applied in full strength, other alkoxyphenylalkyl alcohols, such as p-n-propoxybenzyl alcohol, 1-(p-methoxyphenyl)ethanol, 2-(p-methoxyphenyl)ethanol, 3-(p-methoxyphenyl)-n-propanol, o-methoxybenzyl alcohol, cause no irritation.

Having thus described our invention, what is claimed is:

1. An insect repellent composition comprising a compound of the general formula $$RO.C_6H_4.R'OH$$

wherein R is an alkyl group and R' is a divalent radical having the general formula $C_nH_{2n}$, where $n$ is an integer of at least one, and RO and R'OH are in the ortho position to each other, incorporated in a carrier selected from the group consisting of a vegetable oil, an inert powder, and water.

2. An insect repellent composition comprising a compound of the general formula $$RO.C_6H_4.R'OH$$

wherein R is an alkyl group and R' is a divalent radical having the general formula $C_nH_{2n}$, where $n$ is an integer of at least one, and RO and R'OH are in the para position to each other, incorporated in a carrier selected from the group consisting of a vegetable oil, an inert powder, and water.

3. An insect repellent composition comprising 1-(p-methoxyphenyl)ethanol incorporated in a carrier selected from the group consisting of a vegetable oil, an inert powder, and water.

4. An insect repellent composition comprising 2-(p-methoxyphenyl)ethanol incorporated in a carrier selected from the group consisting of a vegetable oil, an inert powder, and water.

5. An insect repellent composition comprising o-methoxybenzyl alcohol incorporated in a carrier selected from the group consisting of a vegetable oil, an inert powder, and water.

6. An insect repellent composition comprising a compound of the general formula $$RO.C_6H_4.R'OH$$

wherein R is an alkyl group and R' is a divalent radical having the general formula $C_nH_{2n}$, where $n$ is an integer of at least one, and RO and R'OH are in the ortho position to each other, incorporated in an inert powder to form a paste.

7. An insect repellent composition comprising a compound of the general formula $$RO.C_6H_4.R'OH$$

wherein R is an alkyl group and R' is a divalent radical having the general formula $C_nH_{2n}$, where $n$ is an integer of at least one, and RO and R'OH are in the para position to each other, incorporated in an inert powder to form a paste.

8. A method of repelling insects comprising applying to the area from which the insects are to be repelled an insect repellent composition containing as its essential active ingredient a compound of the general formula $$RO.C_6H_4.R'OH$$

wherein R is an alkyl group and R' is a divalent radical having the general formula $C_nH_{2n}$, where $n$ is an integer of at least one, and RO and R'OH are in the ortho position to each other.

9. A method of repelling insects comprising applying to the area from which the insects are to be repelled an insect repellent composition containing as its essential active ingredient a compound of the general formula $$RO.C_6H_4.R'OH$$

wherein R is an alkyl group and R' is a divalent radical having the general formula $C_nH_{2n}$, where $n$ is an integer of at least one, and RO and R'OH are in the para position to each other.

10. A method of repelling insects comprising applying to the area from which the insects are to be repelled an insect repellent composition containing 1-(p-methoxyphenyl)ethanol as its essential active ingredient.

11. A method of repelling insects comprising applying to the area from which the insects are to be repelled an insect repellent composition containing 2-(p-methoxyphenyl)ethanol as its essential active ingredient.

12. A method of repelling insects comprising applying to the area from which the insects are to be repelled an insect repellent composition containing o-methoxybenzyl alcohol as its essential active ingredient.

13. An insect repellent composition comprising a compound of the general formula $$RO.C_6H_4.R'OH$$

wherein R is an alkyl group and R' is a divalent radical having the general formula $C_nH_{2n}$, where $n$ is an integer of at least one, and the relative positions of RO and R'OH are other than the meta position incorporated in a carrier selected from the group consisting of a vegetable oil, an inert powder, and water.

14. A method of repelling insects comprising applying to the area from which the insects are to be repelled an insect repellent composition containing as its essential active ingredient a compound of the general formula $$RO.C_6H_4.R'OH$$

wherein R is an alkyl group and R' is a divalent radical having the general formula $C_nH_{2n}$, where $n$ is an integer of at least one, and the relative positions of RO and R'OH are other than the meta position.

15. An insect repellent composition comprising a p-methoxyphenyl ethanol incorporated in a carrier selected from the group consisting of a vegetable oil, an inert powder, and water.

16. A method of repelling insects comprising applying to the area from which the insects are to be repelled an insect repellent composition containing a p-methoxyphenyl ethanol as its essential active ingredient.

HOWARD A. JONES.
BERNARD V. TRAVIS.